(12) United States Patent
Weiss et al.

(10) Patent No.: US 11,602,025 B2
(45) Date of Patent: Mar. 7, 2023

(54) DIRECT DRIVE AC LED LIGHT

(71) Applicant: BAE Systems Controls Inc., Endicott, NY (US)

(72) Inventors: Darrin M. Weiss, Vestal, NY (US); Felix O. Heimes, Endwell, NY (US)

(73) Assignee: BAE Systems Controls Inc., Endicott, NY (US)

( * ) Notice: Subject to any disclaimer, the term of this patent is extended or adjusted under 35 U.S.C. 154(b) by 161 days.

(21) Appl. No.: 16/936,961

(22) Filed: Jul. 23, 2020

(65) Prior Publication Data
US 2021/0029796 A1 Jan. 28, 2021

Related U.S. Application Data (60) Provisional application No. 62/877,626, filed on Jul. 23, 2019.

(51) Int. Cl.
*H05B 45/22* (2020.01)
*H05B 45/395* (2020.01)
*H05B 45/46* (2020.01)
*B64D 47/02* (2006.01)

(52) U.S. Cl.
CPC ............ *H05B 45/22* (2020.01); *B64D 47/02* (2013.01); *H05B 45/395* (2020.01); *H05B 45/46* (2020.01); *B64D 2203/00* (2013.01)

(58) Field of Classification Search
None
See application file for complete search history.

(56) References Cited

U.S. PATENT DOCUMENTS

| | | | |
|---|---|---|---|
| 7,649,326 B2 | 1/2010 | Johnson et al. | |
| 9,115,876 B1 | 8/2015 | Mart | |
| 9,246,403 B2 | 1/2016 | Siessegger et al. | |
| 9,699,841 B2 * | 7/2017 | Heimes ................. | B64D 11/00 |
| 2007/0285378 A1* | 12/2007 | Lankhorst .............. | G09G 3/342 |
| | | | 345/102 |
| 2012/0305946 A1 | 12/2012 | Kuk et al. | |
| 2014/0361696 A1* | 12/2014 | Siessegger ........... | H05B 45/395 |
| | | | 315/193 |

OTHER PUBLICATIONS

Extended European Search Report dated Feb. 3, 2021 received in European Patent Application No. EP 20187519.2.
EP Search Report, 20187519.2, dated Feb. 3, 2021, 12 pages.

* cited by examiner

*Primary Examiner* — Dedei K Hammond
(74) *Attorney, Agent, or Firm* — Scully Scott Murphy & Presser PC; Gary McFaline

(57) ABSTRACT

Techniques and architecture are disclosed for array of light emitting diodes. For example, the array may comprise a plurality of stages, each stage comprising a plurality of light emitting diodes (LEDs) connected to a floating switch, respectively. The LEDs may be arranged substantially linearly on a circuit board in a plurality of clusters, where a distance between adjacent LEDs within a cluster is smaller than a distance between LEDs in adjacent clusters. Adjacent clusters contain LEDs from different stages and each stage contains LEDs in different clusters. The array may be incorporated in a lighting system. The light system may have a closed loop feedback mechanism which directly detects light emitted from a subset of the LEDs and a controller which controls the array based on the detection.

15 Claims, 6 Drawing Sheets

DIRECT DRIVE AC LED LIGHT

CROSS REFERENCE TO RELATED APPLICATIONS

This application claims the benefit of and priority to U.S. Provisional Application Ser. No. 62/877,626 filed Jul. 23, 2019 the contents of which is incorporated herein by reference.

FIELD OF THE DISCLOSURE

The disclosure relates generally to light emitting diodes (LED), particularly direct drive alternating current (AC) LEDs.

BACKGROUND

Precise color control over a long lifespan is desired with any lighting application that utilizes a linear configuration of a luminaire. However, the basic alternating current (AC) light emitting diode (LED) light drive circuit does not accomplish this. Rather, this basic configuration has several undesirable characteristics. First, there may not be uniform brightness and color control along the fixture over the full control range. Second, there may be a reduction in granularity and precision of the brightness and color control due to the need to compensate for LED aging effects. Third, open loop control of LED lights is problematic.

For example, certain current approaches for interior lighting applications utilize a 4:2:1 voltage ratio between LED stages which causes undesirable variations in light intensity.

Therefore, there is a need for a lighting system that overcomes these issues.

SUMMARY

Accordingly, disclosed is an array of light emitting diodes comprising a plurality of stages of LEDs. Each stage may comprise a plurality of light emitting diodes (LEDs) connected to a floating switch, respectively. The LEDs may be arranged substantially linearly on a circuit board in a plurality of clusters. A distance between adjacent LEDs within a cluster is smaller than a distance between LEDs in adjacent clusters. Adjacent clusters may contain LEDs from different stages and each stage contains LEDs in different clusters.

In an aspect of the disclosure, the LEDs within a cluster may have different colors.

In an aspect of the disclosure, there may be three stages per color and the clusters may comprise a first cluster, a second cluster, a third cluster and a fourth cluster. The first cluster may contain LEDs from the first stage of each respective color in a first position within the first stage for the respective color, the second cluster may contain LEDs from the second stage of each respective color in the first position within the second stage for the respective color, the third cluster may contain LEDs from the third stage of each respective color in the first position within the third stage for the respective color and the fourth cluster may contain LEDs from the first stage of each respective color in a second position within the first stage for the respective color.

In an aspect of the disclosure, each stage of the plurality of stages may have a same number of the LEDs, thereby creating a 1:1:1 ratio for voltages of the plurality of stages thereby creating a uniform and consistent light intensity.

In an aspect of the disclosure, the array may be configured for an aircraft interior.

In other aspects of the disclosure, an array of light emitting diodes may comprise a plurality of light emitting diode packages arranged on a circuit board in a plurality of clusters. Each LED package contains at least three diodes having separate die. A distance between adjacent LED packages within a cluster may be smaller than a distance between LED packages in adjacent clusters. The array may also comprise a plurality of stages comprising a plurality of LEDs and a plurality of floating switches. The plurality of floating switches may be coupled to the plurality of stages, respectively. LEDs within the LED package may be in different stages of the plurality of stages.

In an aspect of the disclosure, the LEDs in a cluster may have a same positional order in the different stages of the plurality of stages.

In an aspect of the disclosure, a number of LED packages in each cluster may be the same.

In an aspect of the disclosure, the LEDs in adjacent clusters may have adjacent positional orders in the plurality of stages.

The various disclosed arrangements of the LED packages enable the plurality of clusters to have a consistent mixed color.

In an aspect of the disclosure, LEDs with an LED package may have a different color.

In an aspect of the disclosure, each cluster may have four LED packages.

In other aspects of the disclosure, a system may comprise a plurality of LEDs, a plurality of clusters comprising the plurality of LEDs, a plurality of stages comprising the plurality of clusters, a plurality of floating switches and variable resistance. Each of the plurality of floating switches may be connected to a corresponding one of the plurality of stages. The variable resistance may have at least two set points configured to maintain control resolution of the system.

In an aspect of the disclosure, the variable resistance is provided by at least one resistor which may be switched into or out of a current sense path. In other aspects, the variable resistance may be provided by a variable resistor having the at least two set points.

In an aspect of the disclosure, the system may further comprise a closed loop feedback mechanism for each color LED in a luminaire. The closed loop feedback mechanism may provide feedback of the each color LED over time and temperature.

In an aspect of the disclosure, the closed loop feedback mechanism may comprises an emitter and a detector housed within a same enclosure. The emitter and the detector may be shielded from ambient light and from each other in order to maintain measurement integrity.

In other aspects of the disclosure, a system may comprise a plurality of LEDs, a plurality of clusters comprising the plurality of LEDs, a plurality of stages comprising the plurality of clusters and a plurality of floating switches. Each of the plurality of floating switches may be connected to a corresponding one of the plurality of stages. A subset of the plurality of LEDs may be arranged on a first side of a circuit board and at least one LED of each color may be arranged on a second side of the circuit board opposite to the first side. The system may further comprise a light sensor disposed on a second circuit board facing the at least one LED of each color and a controller configured to receive detection results from each light sensor and a control current control signal input to a linear current regulator per color based on the respective detection results.

In an aspect of the disclosure, the system may further comprise a plurality of baffles between the first circuit board and the second circuit board and located between adjacent light sensors.

In an aspect of the disclosure, the at least one LED of each color may be from a same cluster.

In other aspects of the disclosure, the LEDs are arranged in packages and at least one package is arranged on the second side.

Implementations of the techniques discussed above may include a method or process, a system or apparatus, a kit, or a computer software stored on a computer-accessible medium. The details or one or more implementations are set forth in the accompanying drawings and the description below. Other features will be apparent from the description and drawings, and form the claims.

These and other features will be understood better by reading the following detailed description, taken together with the figures herein described. The accompanying drawings are not intended to be drawn to scale. For purposes of clarity, not every component may be labeled in every drawing.

DETAILED DESCRIPTION

Figure 1:
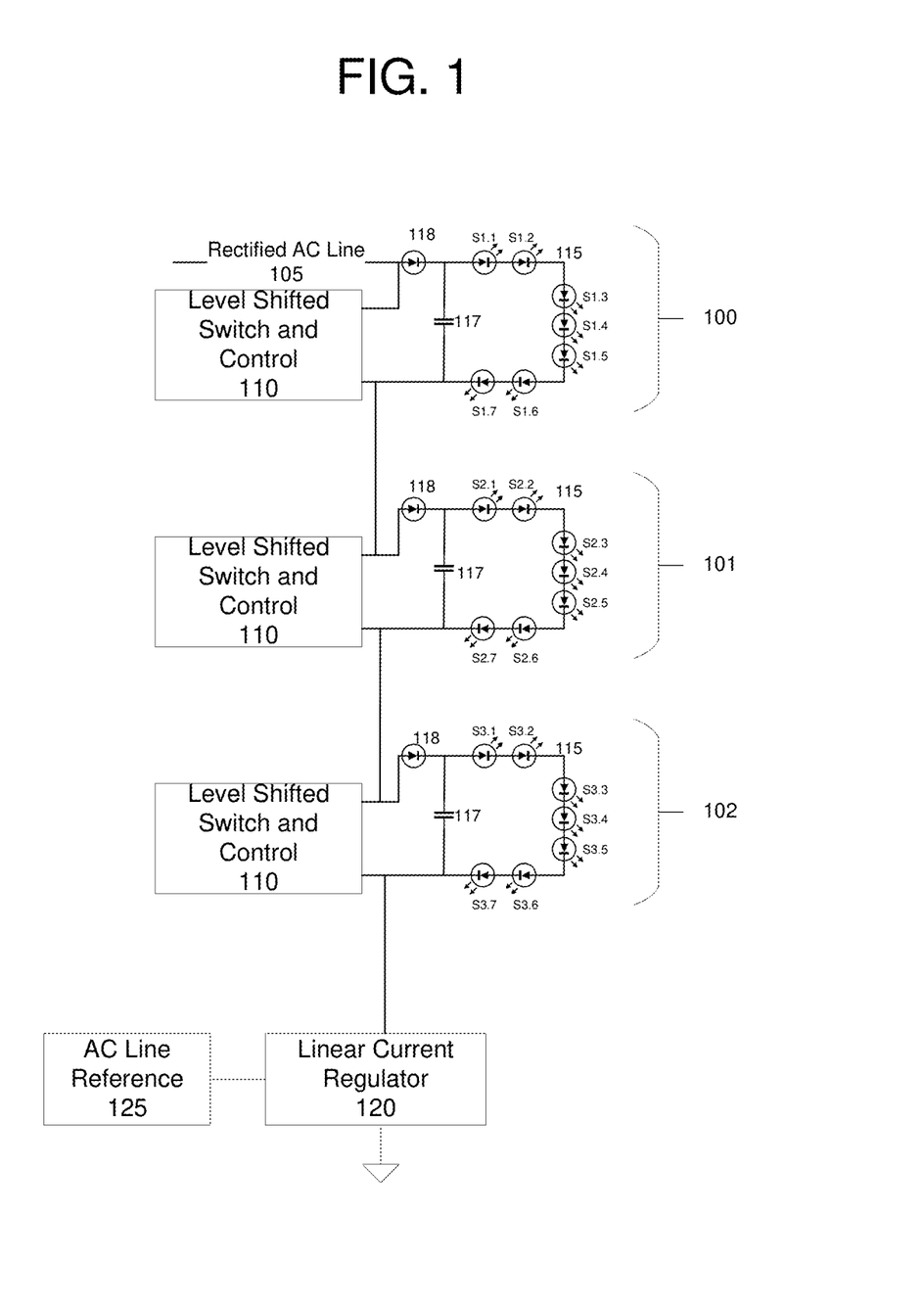
FIG. 1 is a diagram showing an LED stage configuration having a 1:1:1 voltage ratio in accordance with aspects of the disclosure.

FIG. 1 is a diagram showing an LED stage configuration for a luminaire 600 in accordance with aspects of the disclosure. In accordance with aspects of the disclosure, the number of light emitting diodes (LEDs) 115 in each stage is the same. For clarity purposes of FIG. 1, only one LED in each stage is labeled "115". In FIG. 1, there are three stages, stage 1 100, stage 2 101 and stage 3 102. However, the number of stages is not limited to three.

Generally, a standard configuration of LED stages connected to a series of floating switches has a 4:2:1 ratio. However, this configuration may exhibit undesirable variability as the fixture is operated over the full dimming and full color control. At lower brightness/current levels, the stage currents and light intensity may vary, thereby causing undesirable visible variations in light intensity along the length of the luminaire 600.

In an aspect of the disclosure, because each stage may have the same number of LEDs and the same voltage drop, the light intensity of the luminaire 600 may be more consistent. As depicted, each stage has seven LEDs. However, the number of LEDs in a stage may be different and depending on the application and the rectified AC line 105. For example, the number of LEDs in a stage may be fourteen.

FIG. 1 depicts the stages for a single color; however, in aspects of the disclosure, the LEDs 115 may be different colors. For example, in an aspect of the disclosure, there may be red, green, and blue LEDs. In other aspects, white LEDs could also be used as a fourth color.

Each color may include three stages. The stages for each color may be the same. For example, stage 1 100 for red, green and blue LEDs may have the same topology. In an aspect of the disclosure, the stages for each color have the same number of LEDs 115. However, in other aspects of the disclosure, the stages for different colors may have different number of LEDs 115. The number of LEDs in different colors may be based on the lighting application.

In the figures, the LEDs 115 are represented by a nomenclature Sm.n. "m" refers to the stage number and "n" refers to the position of the LED in the stage. For example, S1.1 means that the LED is in the first stage and positioned in the first position, S1.7 means that the LED is in the first stage and positioned in the seventh position, whereas S2.1 means that the LED is in the second stage and positioned in the first position.

Each stage 100-102 may include a capacitor 117 in parallel with the LEDs 115 to regulate the voltage as the level-shifted switch ("switch" also referenced as floating switch) cycles, in order to reduce voltage fluctuations which can lead to flicker. Each stage 100-102 respective includes Level-Shifted Switch and Control 110. The Level-Shifted Switch and Control may include a driver and a switch. In an aspect of the disclosure, the driver and switch may be incorporated into a single package, e.g., chip such that the control of the switching is analog. For example, a floating switch such as one available from Texas Instruments part number TPS92411 may be used. The ON time and OFF time of the switch is determined by a pair of resistors connected between the terminals of the floating switch. Thus, the ON time and OFF time may be fixed.

Figure 5:
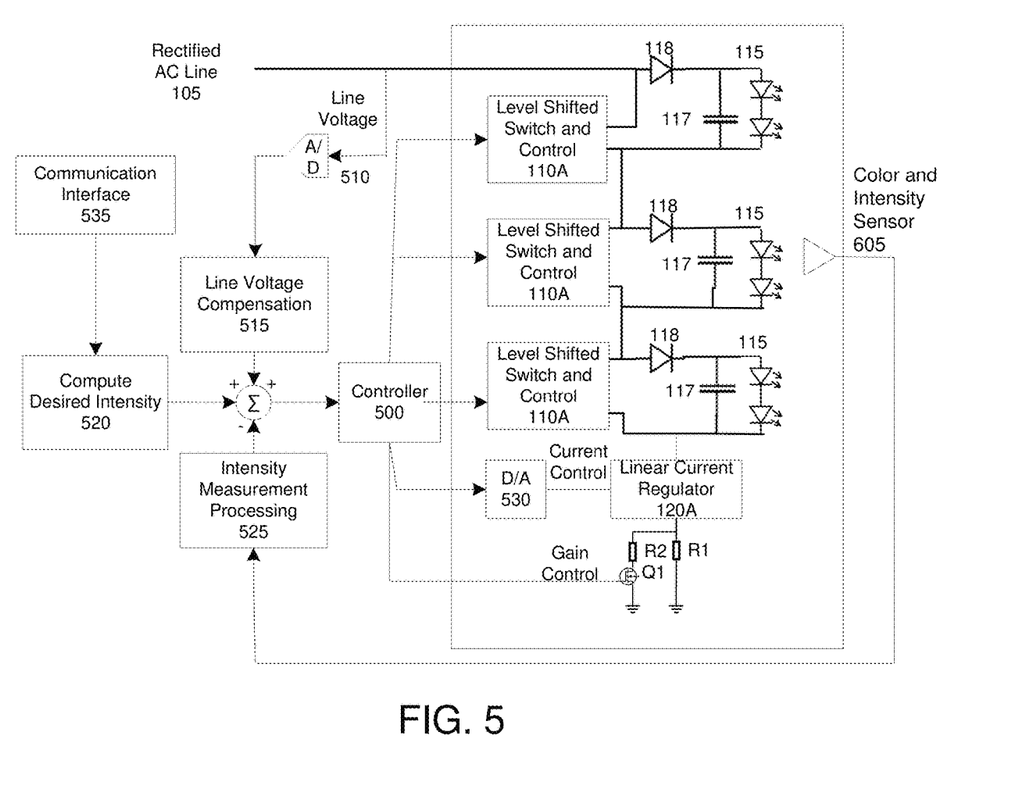
FIG. 5 is a block diagram of a lighting system in accordance with aspects of the disclosure.

In other aspects, the driver and the switch may be separate. In other aspects of the disclosure, the driver(s) may be driven by a controller such as shown in FIG. 5.

Each stage 100-102 may also include a diode 118 to prevent discharging of the capacitor 117 through the switches instead of through the LEDs 115.

An AC power source (not shown in FIG. 1) is rectified (not shown in FIG. 1) to provide the rectified AC Line 105. Depending on the state of the switches, the rectified AC line 105 is applied to the LEDs 115. The LEDs 115 in each stage are series connected.

The AC LED light works by connecting the rectifier AC line 105 directly across the string of LEDs using the switches and the linear current regulator 120.

FIG. 1 shows an AC Line Reference 125 being supplied to the linear current regulator 120. There are many ways to provide the AC Line Reference 125 to the linear current regulator 120.

For example, in an aspect of the disclosure, the rectified AC line 105 may be directly connected to the linear current regulator 120 as the AC line Reference 125. In other aspects of the disclosure, the rectified AC Line 105 may be connected to the input terminal Vin of a linear driver such as a driver available from Texas Instruments as part number TPS92410. The rectified AC line 105 may also be connected to other terminals of the linear driver via resistors. In this aspect of the disclosure, the ON time and the current output by the linear current regulator 120 is determined by analog components.

In other aspects, when a digital controller is used, such as shown in FIG. 5, the rectified AC line 105 may also be supplied to the digital-to-analog converter (DAC) 530 (also referenced as D/A) via a resistor network (not shown). The DAC 530 may be a 12 bit D/A. The resistor network may be a resistor divider network. For example, one or more resistors may be connected to a reference pin (terminal) for the DAC 530. Resistors may also be connected to the control pins (terminals) for the DAC 530. The controller 500 applies the control signals to the DAC 530 such that the reference is scaled and applied to the linear current regulator 120A. In other aspects, the reference may be generated by the controller 500 such as shown in FIG. 5 where the controller monitors the rectified AC line 105 and generates a line voltage compensation 515.

Figure 2A:
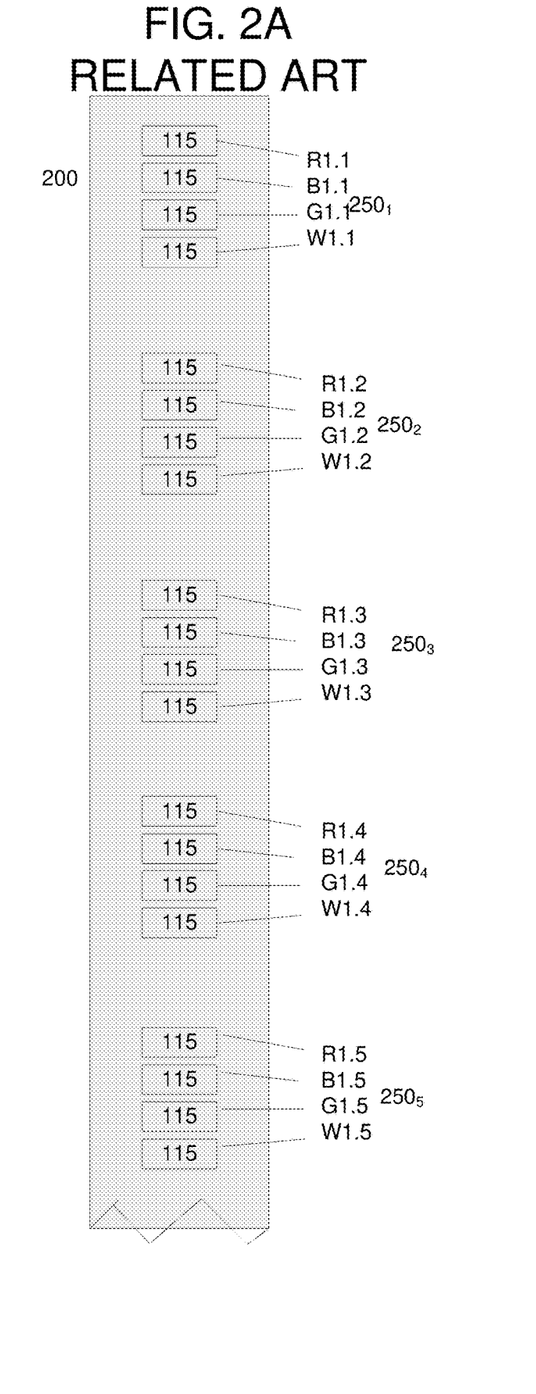
FIG. 2A is a diagram showing a typical LED layout for a LED circuit board and FIG. 2B is a diagram showing an interleaved LED layout for a LED circuit board in accordance with aspects of the disclosure.
Figure 2B:
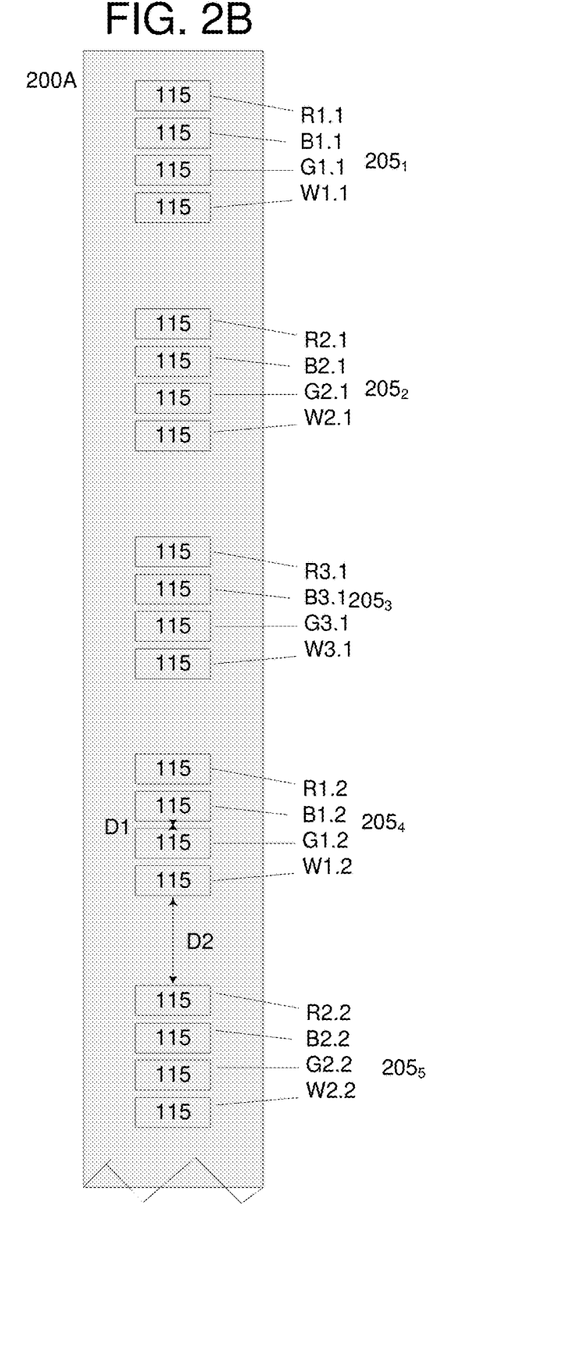

FIG. 2B is a diagram showing an interleaved LED layout in accordance with aspects of the disclosure. The LEDs 115 are arranged along the LED circuit board 200A. In accordance with aspects of the disclosure, the LEDs 115 are arranged to be substantially aligned in a direction of the length of the LED circuit board 200A. The LEDs 115 are arranged in clusters $205_{1-N}$. FIG. 2B depicts 5 clusters $205_{1-5}$ for descriptive purposes only. However, the luminaire 600 may have more than 5 clusters. For example, for a 3 stage, four color, 7 LEDs in each stage luminaire, there may be 27 clusters. The distance between LEDs 115 in a cluster 205 is D1. The distance between LEDs 115 in different clusters, e.g., $205_1$ and $205_2$, is D2. In accordance with an aspect of the disclosure, D2 is greater than D1.

In accordance with an aspect of the disclosure, the distance between clusters D2 may be uniform across the LED circuit board 200A. Further, in accordance with an aspect of the disclosure, the distance between LEDs 115 (within a cluster 205) D1 may be the same.

LEDs of different colors may be arranged in the same cluster 205. For example, the second cluster $205_2$ may comprise LEDs 115 of four different colors, e.g., red (R), blue (B), green (G) and white (W). Additionally, in an aspect of the disclosure, LEDs in the same position may be arranged in the same cluster. For example, as shown, the second cluster $205_2$ may comprise R2.1, B2.1, G2.1 and W2.1. The second cluster $205_2$ may have LEDs in the first position in a stage.

The interleaved layout in accordance with aspects of the present disclosure, seen in FIG. 2B, may implement adjacent clusters 205 with LEDs from adjacent stages in the circuit. For example, the second cluster $205_2$ may have LEDs 115 from the second stage 101 whereas the third cluster $205_3$ may have LEDs 115 from the third stage 102. The third cluster $205_3$ may have LEDs 115 from the third stage 102, first position and the fourth cluster $205_4$ may have LEDs from the first stage 100, second position. This interleaved layout may allow for increased light uniformity. For example, if the first stage of the circuit has a lower current level, LEDs with lower output intensity may be uniformly distributed across the circuit board, thereby creating a more uniform appearance of light from the luminaire 600. This is particularly advantageous where analog control is used for both the ON time and current output of the linear current regulator 120 such as when the above drivers are used.

The arrangement is not limited to the order depicted in FIG. 2B. For example, the first cluster $205_1$ may have LEDs 115 from the second stage 101 and the second cluster $205_2$ may have LEDs 115 from the first stage 100. Further, the order of repetition of the stages may change along the LED circuit board 200A. For example, as depicted in FIG. 2B, the order is stage 1 100-stage 3 102 (repeated), however, it is not limited to the same. The order may be stage 1 100-stage 3 102 for the first three clusters, and stage 2 101, stage 3 102, stage 1 100 for the second three clusters, and stage 3 102, stage 1 100, stage 2 101 for the third three clusters or other orders.

As such, the interleaved approach may alternate the LEDs from each string along the length of the luminaire 600. In contrast, the typical LED layout may place the LEDs in the LED circuit board 200 in the same order that they are connected in within the circuit as shown in FIG. 2A. For example, as shown in FIG. 2A, the second cluster $250_2$ has LEDs in the first stage, second position and the adjacent clusters (first cluster $250_1$ and third cluster $250_3$) have LEDs from the same stage, e.g., stage 1, but at different positions. In the arrangement depicted in FIG. 2A, light intensity may be different on different sides of the LED circuit board 200, especially where analog control is used such as using the drivers described above.

FIG. 2B illustrates an arrangement of the LED circuit board 200A where individual LEDs are arranged. In other aspects of the disclosure, the LEDs may be in an LED package 300.

Figure 3:
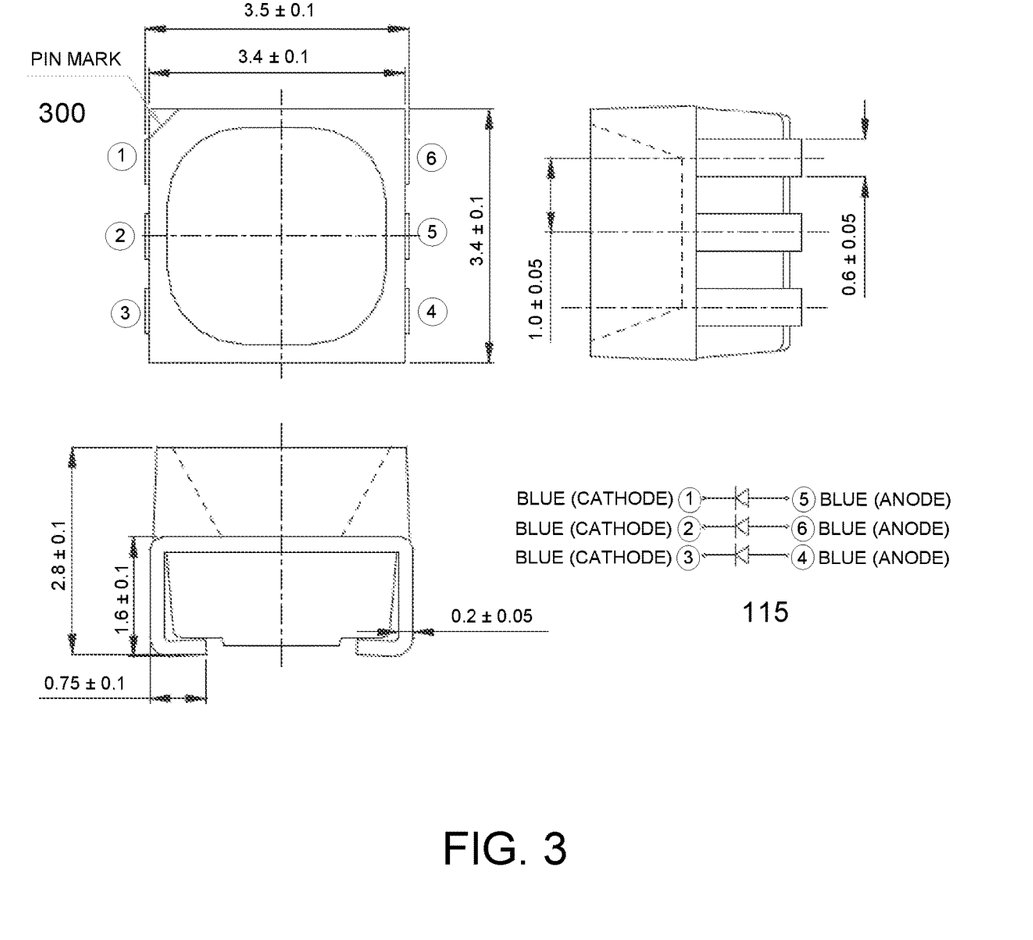
FIG. 3 is a diagram of a single LED package with three separate die in accordance with aspects of the disclosure.

FIG. 3 is a diagram of a single LED package 300 with three separate die which may be used in the luminaire 600 in accordance with aspects of the disclosure. The single LED package 300 may have LEDs of substantially the same color. Since the package 300 comprises three separate die, the color may not be exactly the same. Each die (LED) may be assigned to a separate stage. For example, one of the LEDs in the package 300 may be for the first stage 100, one of the LEDs in the package 300 may be for the second stage 101 and one of the LEDs in the package 300 may be for the third stage 102. In an aspect of the disclosure, the LEDs in the package 300 may have the same position within the stage.

The package 300 depicted in FIG. 3 are blue. In accordance with aspects of the disclosure, this blue package may contain LEDs for the three different stages, e.g., the first stage 100, the second stage 101 and the third stage 102 all in the same position, e.g., the first position.

In other aspects of the disclosure, the package 300 may have LEDs having different colors.

Figure 4:
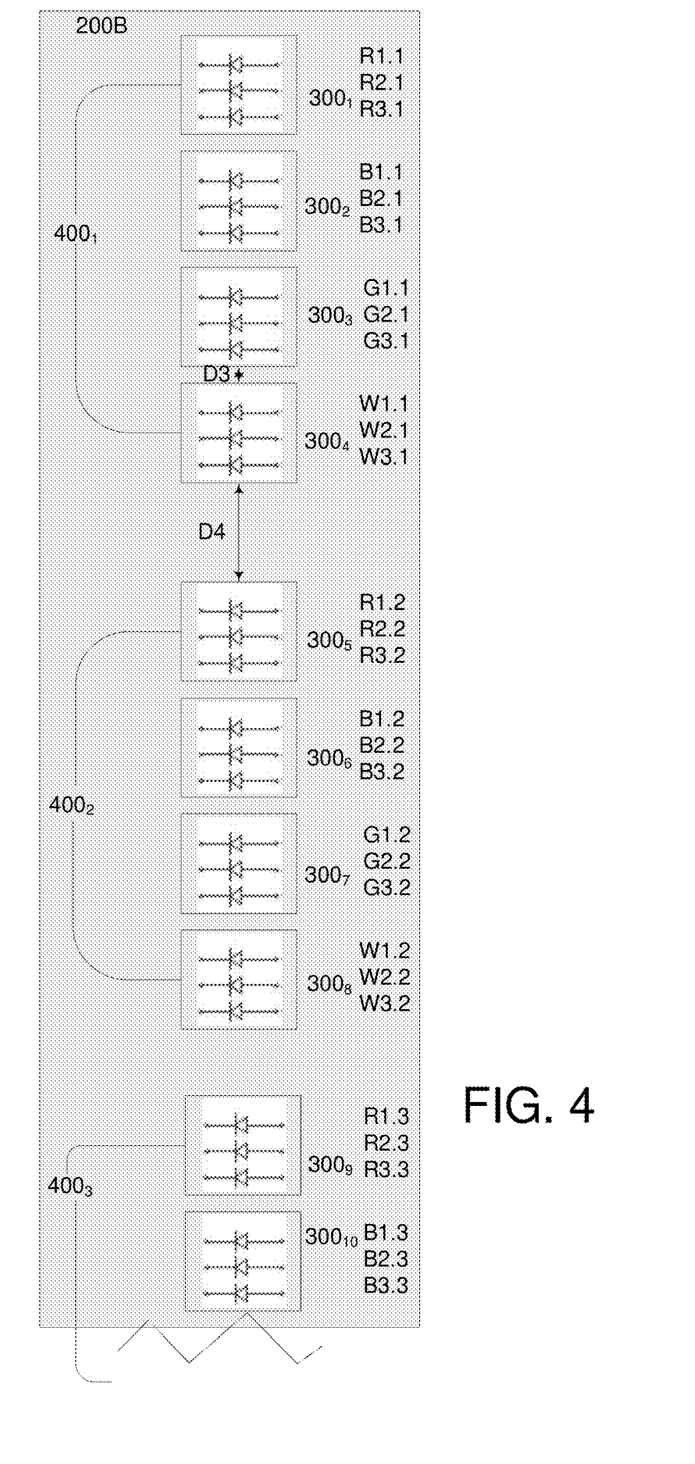
FIG. 4 is a diagram of an interleaved layout for a LED circuit board that utilizes the single LED package seen in FIG. 3 in accordance with aspects of the disclosure.

FIG. 4 is a diagram of an interleaved layout for the LED circuit board 200B that utilizes the single LED package 300 seen in FIG. 3 in accordance with aspects of the disclosure. The first package $300_1$ of a first color may have three independent die of that color, consisting of the first LED from each of the three stages. If the current and intensity of the stages differ, the light emitted from the three die LED package 300 is mixed in the part thereby providing the same intensity.

In an aspect of the disclosure, the packages $300_{1-N}$ may be arranged in clusters $400_{1-N}$. For example, each cluster 400 may include multiple packages 300 containing die (LEDs) of different colors. As depicted, each cluster 400 may consist of four three-die packages, where the packages are RGBW colors. However, in other aspects of the disclosure, each cluster 400 may consist of three three-die packages where the packages are RGB. The number of packages in each cluster may be based on the number of colors in the luminaire 600.

In an aspect of the disclosure, these packages 300 within the cluster 400 may be positioned close together to enable good color mixing for the cluster 400. The clusters 400 may have packages 300 containing LEDs 115 from consistent LED positions in the stages 100-102. In an aspect of the disclosure, the first cluster 400₁ may include all of the first positioned LEDs 115 in all stages 100-102 of each color. The second cluster 400₂ may include all of the second positioned LEDs 115 from each stage 100-102. With this arrangement, the current in the stages may vary, but every LED package 300 may have substantially the same intensity. Additionally, every LED cluster 400 may have a consistent mixed color.

The distance between adjacent packages 300 is D3 (within a cluster 400). The distance between adjacent clusters, e.g., 400₁ and 400₂ (e.g., packages in adjacent clusters), is D4. Distance D4 is greater than distance D3. The packages 300 may be substantially aligned in the length direction.

FIG. 5 is a diagram of a lighting system in accordance with aspects of the disclosure. Many of the components with the system are the same as shown in FIG. 1. Like FIG. 1, FIG. 5 shows the stages for a single color. When the lighting system includes multiple colors, there would be similar stages and DAC 530 and linear current regulator 120A for each color.

In accordance with an aspect of the disclosure, the linear current regulator 120A may be connected to resistance (or resistance may be incorporated into the linear current regulator 120A). The linear current regulator 120A in FIG. 5 may be different from the linear current regulator 120 in FIG. 1. For example, a linear driver such as the driver available from Texas Instruments may be used. The system may include a switchable gain resistor with multiple set points such that control resolution can be maintained. As depicted in FIG. 5, a resistor R2 may be switched into the current sense path of the linear current regulator 120A. The number of resistors included may be application based such as based on where the system is located. For example, there may be a different number of resistors for a system for a building than a system for an aircraft. In other aspects of the disclosure, the number of resistors may be based on the DAC 530 used. As LEDs 115 in a luminaire 600 start to age, the nominal current may need to be increased. If the dimming control function (e.g. digital to analog converter) needs to accommodate this variation, then it comes at the expense of control resolution because higher ranges of the converter must be reserved for future increases in current. Therefore, in an aspect of the disclosure, one or more resistors may be switched into or out of the current sense path (e.g., R2). The current resistor R1 is fixed (e.g., not connected to a switch such as Q1). In an aspect of the disclosure, the switch may be a MOSFET Q1. In other aspects of the disclosure, other semiconductor devices may be used as a switch. In other aspects of the disclosure, other types of switches may be used. In an aspect of the disclosure, a controller 500 may control the switch(es) Q1, e.g., the current sense resistor so that the maximum current range may be increased or decreased in order to optimize usable resolution. The changes of the current sense resistance (resistor(s)) changes the reference input to an operational amplifier in the linear current regulator 120A. The other terminal of the operational amplifier may be connected (whether directly or indirectly) to the output pin (terminal) of the DAC 530.

In other aspects of the disclosure, instead of using one or more switchable resistor(s), e.g., switches, the system may include a variable resistor (replace R1 with the variable resistor). The controller 500 may control the resistance of the variable resistor so that the maximum current range may be increased or decreased in order to optimize usable resolution. In an aspect of the disclosure, the variable resistor may be a potentiometer. However, other variable resistors may be used such as a digital variable resistor.

In an aspect of the disclosure, the controller 500 may be a microcontroller. In other aspects of the disclosure, the controller 500 may be a single or multi-core CPU. In other aspects of the disclosure, the controller 500 may be a field programmable gate array (FPGA).

Control of intensity (and brightness), and thereby color may be achieved through adjustment of current output from the linear current regulators 120A. In an aspect of the disclosure, each color may be independently controlled with its own linear current regulator 120A. The change in intensity of one or more colors relative to other colors produces mixed output color in a controllable manner. For example, various shades of purple can be achieved with appropriate control of red and blue LED intensity.

Intensity may also be controlled via the Level Shifted Switch and Control 110A. As described above, the switch and driver may be separate. A controller may control the level shifted gate driver to control the ON time of the LEDs 115. In an aspect of the disclosure, the controller 500 also controls the switches. In other aspects of the disclosure, a different controller may control the switches via the level shifted gate driver.

FIG. 5 also illustrates certain other functionality of a controller such as line voltage compensation 515, compute desired intensity 520 and intensity measurement processing 525. In some aspects of the disclosure, these functions are executed by the controller 500. As shown, the outputs are aggregated as an input to the controller 500. The controller 500 may implement a PI control. In other aspects, the controller 500 may implement a PID control between set points and measured process variable (e.g., error values). Thus, the controller employs a closed-control loop feedback mechanism. This feedback mechanism may take in account desired intensity, nominal intensity, adjustment for age of the LED, etc.

The line voltage compensation 515 is to accommodate voltage fluctuation in the rectified line voltage 105. The line voltage compensation 515 continuously monitors the rectified line voltage 105 via an analog-to-digital (A/D) converter 510. In other aspects, a current sense circuit may be added to accurately measure the current.

In an aspect of the disclosure, the system may also have a communication interface 535 such as RS485 serial connection to an external controller. For example, when the luminaire 600 is installed in an aircraft, the system may receive a desired intensity command from a cabin controller or the flight deck. In other aspects of the disclosure, the luminaire 600 may be directly connected to a dimming control switch. In other aspects of the disclosure, the interface may be a wireless communication interface. For example, the interface may be a Bluetooth interface (BLE) or other near field communication. In other aspects, the interface may include a Zigbee specification low power mesh wireless device, which may operate at a set frequency to eliminate any interface with other networks. For example, when the system in installed in an aircraft, there may be other wireless networks (802.11) such as in-flight entertainment systems.

The controller 500 computes the desired intensity based on the input received from the interfaces. In an aspect of the disclosure, the intensity measurement processing 525 uses sensed intensity and color from a color and intensity sensor 605 to control the LED current, e.g., direct feedback.

Figure 6:
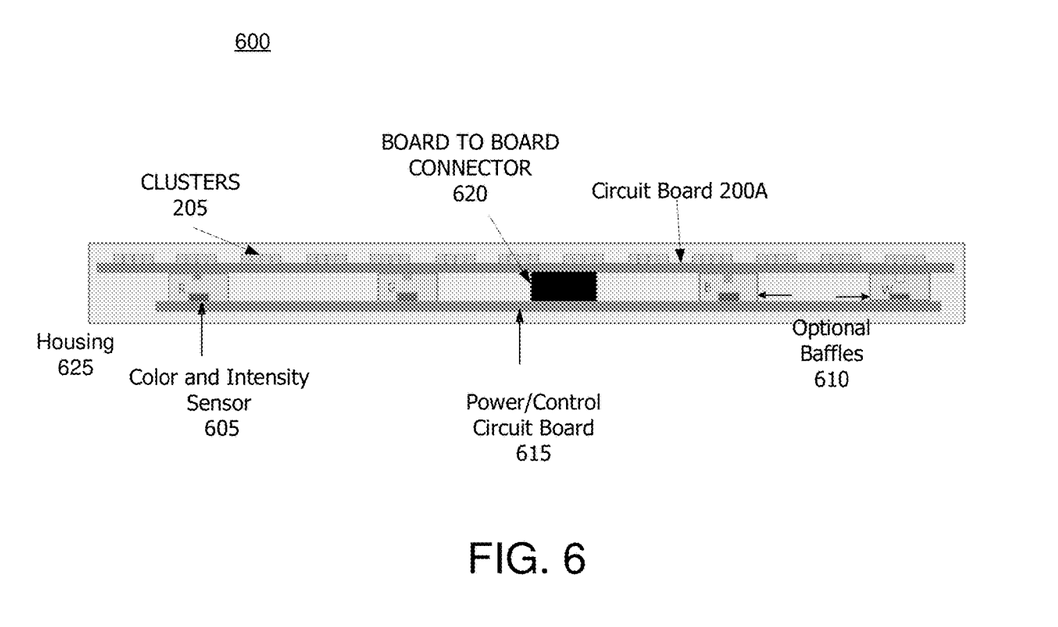
FIG. 6 is an illustration of an implementation of a closed-loop feedback mechanism in a luminaire in accordance with aspects of the disclosure.

FIG. 6 is an illustration of an implementation of direct intensity and color measurement in a luminaire 600 in accordance with aspects of the disclosure. Aging compensation for the LEDs 115 in a luminaire 600 requires an accurate life model of the LEDs, which may be a challenge to implement precisely. Therefore, in an aspect of the disclosure, there may be a feedback mechanism for each color LED in the luminaire 600. This feedback mechanism may provide feedback of the LED 115 over both time and temperature.

In an aspect of the disclosure, since the intensity and color is measured directly, a separate temperature sensor for detecting the temperature around the LEDs 115 may be eliminated. Additionally, since the intensity and color is measured directly, it eliminates a need to maintain and accumulate a history of current and temperature exposure of the LEDs 115 over time.

In an aspect of the disclosure, a Color and Intensity Sensor 605 (e.g., light detector) may be arranged on a second circuit board such as a power and control board 615. The Color and Intensity Sensor 605 may be an RGBW color sensor such that the same type of sensor may be used to detect all of the colors in the luminaire 600. For example, the Color and Intensity Sensor 605 may be a Color Sensor IC. In other aspect of the disclosure, a different type of sensor may be used to detect each respective color. The number of sensors 605 may equal the number of colors in the luminaire 600. For example, as depicted, there are four sensors 605, e.g., one for each color. However, in other aspects, there may be three sensors 605, one for blue, red and green.

At least one LED of each color is arranged on the opposite side (as shown in FIG. 6, bottom side) of the circuit board 200A. FIG. 6 depicts one LED 115 from each color. For example, LEDs 115 from the same cluster may be arranged on the opposite side of the circuit board 200A. This is to avoid having color inconsistency in a cluster. For example, if a single LED is removed from a cluster, the color mixing may be different across the board. The remaining clusters 205 on the top side (as shown) of the LED circuit board 200A may have a greater spacing than when all of the clusters 205 are arranged on the top side.

However, in other aspects of the disclosure, an LED 115 from each stage may be arranged on the opposite side and detected. Where one LED 115 of each color is arranged on the opposite side, in an aspect of the disclosure, the LED 115 may be from the same respective stage in the luminaire 600. In other aspects of the disclosure, the LED 115 may be from different stages in the luminaire 600. In other aspects of the disclosure, the LEDs 115 on the opposite side may be located in the same position with the stage. In other aspects of the disclosure, the LEDs 115 may be from different clusters.

In a case where a package 300 is used instead of individual diode, one package from each color may be arranged on the opposite side (as shown in FIG. 6, bottom side) of the circuit board 200B (from the other LED packages 300). In an aspect of the disclosure, the LED packages 300 of the same position may be used. In other aspects of the disclosure, packages from a first position and fourth position and a seventh position such that the packages 300 used for detection do not impact the uniformity of the intensity across the luminaire 600. For example, if all of the packages 300 from the same cluster are used for intensity and color detection, there may be unevenness across the luminaire 600, e.g., no LEDs in a specific position. This may not be a concern where individual LEDs are used.

In an aspect of the disclosure, an emitter (LED) and one of the color and intensity sensors 605 may be contained within the same enclosure and may be shielded from both ambient light and other LEDs (and corresponding color and intensity sensors 605). For example, baffles 610 may be used as a divider. In an aspect of the disclosure, the baffles 610 may extend between the circuit boards 200A (or board 200B) and 615 (LED circuit board and Power/control circuit board, respectively). The baffles 610 may be attached to both circuit boards 200A and 615. While FIG. 6 depicts the baffles 610 to be substantially perpendicular to the boards 200A and 615, in other aspects, the baffles 610 may be angled relative to perpendicular.

The use of baffles 610 (dividers) may help maintain the integrity of each desired color. With this arrangement, the color and intensity sensors 605 may achieve an accurate measurement of the individual LED colors. Further, the LEDs 115 used for intensity detection are installed on the same LED circuit board 200A as the LEDs used for illumination; therefore, they may age at the same rate as the illumination LEDs 115. The use of baffles 610 may be optional and may depend on the length of the luminaire 600.

The color and intensity sensors 605 report the detection to the controller 500, e.g., intensity measurement processing 525. The controller 500 generates the signal(s) to the DAC 125 using the computed desired intensity 520 and adjusted by the intensity measurement processing 525 and the line voltage compensation 515. In other aspects, the controller 500 may drive the level shifted gate driver to drive the switches based on the computed desired intensity 520 and adjusted by the intensity measurement processing 525 and the line voltage compensation 515.

The color and intensity sensors 605 may have different electrically properties at different temperatures. Depending on the type of color and intensity sensors 605 used, in an aspect of the disclosure, a temperature sensor may be arranged proximate to the color and intensity sensors 605 on the power/control circuit board 615, respectively. The temperature sensor and color and intensity sensors 605 report the detections to the controller 500, e.g., intensity measurement processing 525.

In some aspects of the disclosure, the LEDs 115 may be arranged in clusters as shown in FIGS. 2B and 4. In other aspects, the LEDs may be arranged in clusters as shown in FIG. 2A since the dimming may be controlled via the controller 500 and feedback.

The circuit boards (LED circuit board 200A and power/control circuit board 615) are located with the housing 625 of the luminaire 600.

In an aspect of the disclosure, the luminaire 600 described herein may be used for aircraft lighting such as in-cabin. In other aspects, the luminaire 600 may be used for lighting in other vehicles such as buses, boats, trains and cars. For example, the luminaire 600 may be mounted to the overhead storage bins. In other aspects of the disclosure, the luminaire 600 may be installed in a building such as hall lights, theatre lighting or elevator lighting.

As described above, the LEDs may receive power via the rectified AC line 105. However, in other aspects of the disclosure, an AC-AC transformer may be used to increase or reduce the peak line voltage delivered to the luminaire 600. The use of a transformer may be based on the available input AC power and the application for the luminaire 600.

The housing 625 holds the circuit boards, e.g., 200A and 615. The circuit boards 200A, 615 may be mounted in the housing 625 via snap in fasteners. The housing 625 may have an opening for a board to board connector 620. The luminaire 600 may also have a diffuser is positioned over the LED board 200A. The diffuser may be held in place via slots in the housing 625. The diffuser scatters the light emitted from the LEDs 115 in a chosen manner in order to reduce the effect of the light being emitted from LEDs 115 behaving like point sources of light.

In an aspect of the disclosure, the housing 625 may be made of aluminum and formed by extruding.

In an aspect of the disclosure, the luminaire 600 may be modular and connected with other luminaire(s). This may be achieved via end caps with respective opens for connectors. The connectors enable the luminaire 600 to be connected to other luminaire(s) in a daisy chain. The connector being male on the external end and the other being female. The connectors may supply the power (AC line) and control signals from an external controller. For example, when the luminaire 600 is installed in an aircraft, the power may come from the aircraft power, e.g., 115 VAC.

The luminaire 600 may be mounted using mounting brackets.

Various aspects of the present disclosure may be embodied as a program, software, or computer instructions embodied or stored in a computer or machine usable or readable medium, or a group of media which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided, e.g., a computer program product.

The computer readable medium could be a computer readable storage device or a computer readable signal medium. A computer readable storage device, may be, for example, a magnetic, optical, electronic, electromagnetic, infrared, or semiconductor system, apparatus, or device, or any suitable combination of the foregoing; however, the computer readable storage device is not limited to these examples except a computer readable storage device excludes computer readable signal medium. Additional examples of the computer readable storage device can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an optical storage device, or any appropriate combination of the foregoing; however, the computer readable storage device is also not limited to these examples. Any tangible medium that can contain, or store, a program for use by or in connection with an instruction execution system, apparatus, or device could be a computer readable storage device.

A computer readable signal medium may include a propagated data signal with computer readable program code embodied therein, such as, but not limited to, in baseband or as part of a carrier wave. A propagated signal may take any of a plurality of forms, including, but not limited to, electromagnetic, optical, or any suitable combination thereof. A computer readable signal medium may be any computer readable medium (exclusive of computer readable storage device) that can communicate, propagate, or transport a program for use by or in connection with a system, apparatus, or device. Program code embodied on a computer readable signal medium may be transmitted using any appropriate medium, including but not limited to wireless, wired, optical fiber cable, RF, etc., or any suitable combination of the foregoing.

The foregoing description of the aspects of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

What is claimed is:

1. An array of light emitting diodes comprising:
    a plurality of stages, each stage comprising a plurality of light emitting diodes (LEDs) connected to a floating switch, respectively, the LEDs arranged substantially linearly on a circuit board in a plurality of clusters, where a distance between adjacent LEDs within a cluster is smaller than a distance between LEDs in adjacent clusters;
    wherein adjacent clusters contain LEDs from different stages, each stage contains LEDs in different clusters, and wherein the LEDs within a cluster have different colors; and
    wherein there are three stages per color, and wherein the clusters comprises a first cluster, a second cluster, a third cluster and a fourth cluster, wherein the first cluster contains LEDs from the first stage of each respective color in a first position within the first stage for the respective color, the second cluster contains LEDs from the second stage of each respective color in the first position within the second stage for the respective color, the third cluster contains LEDs from the third stage of each respective color in the first position within the third stage for the respective color and the fourth cluster contains LEDs from the first stage of each respective color in a second position within the first stage for the respective color.

2. The array of claim 1, wherein each stage of the plurality of stages has a same number of the LEDs, thereby creating a 1:1:1 ratio for voltages of the plurality of stages thereby creating a uniform light intensity.

3. The array of claim 1, wherein the array is configured for an aircraft interior.

4. An array of light emitting diodes comprising:
    a plurality of light emitting diode (LED) packages arranged on a circuit board in a plurality of clusters, each LED package contains at least three diodes having separate dies, where a distance between adjacent LED packages within a cluster is smaller than a distance between LED packages in adjacent clusters;
    a plurality of stages comprising a plurality of LEDs;
    a plurality of floating switches, wherein the plurality of floating switches is coupled to the plurality of stages, respectively, and wherein LEDs within the LED package are in different stages of the plurality of stages;
    wherein LEDs in a cluster have a same positional order in the plurality of stages; and
    wherein LEDs in adjacent clusters have adjacent positional orders in the plurality of stages.

5. The array of claim 4, wherein a number of LED packages in each cluster are the same.

6. The array of claim 5, wherein each cluster has four LED packages.

7. The array of claim 4, wherein an arrangement of the LED packages enables the plurality of clusters to have a same intensity and a consistent mixed color.

8. The array of claim 4, wherein LEDs with an LED package have a different color.

9. A system comprising:
a plurality of light emitting diodes (LEDs);
a plurality of clusters comprising the plurality of LEDs; a plurality of stages comprising the plurality of clusters;
a plurality of floating switches, wherein each of the plurality of floating switches is connected to a corresponding one of the plurality of stages; and
a variable resistance having at least two set points configured to maintain control resolution of the system;
a closed loop feedback mechanism for each color LED in a luminaire, wherein the closed loop feedback mechanism provides feedback of the each color LED over time and temperature; and
wherein the closed loop feedback mechanism comprises an emitter and a detector housed within a same enclosure, wherein the emitter and the detector are shielded from ambient light and from each other in order to maintain measurement integrity.

10. The system of claim 9, wherein the variable resistance comprises at least one resistor, wherein the at least one resistor may be switched into or out of a current sense path.

11. The system of claim 9, wherein the variable resistance comprises a variable resistor having the at least two set points to provide the variable resistance.

12. A system, comprising:
a plurality of light emitting diodes (LEDs);
a plurality of clusters comprising the plurality of LEDs; a plurality of stages comprising the plurality of clusters;
a plurality of floating switches, wherein each of the plurality of floating switches is connected to a corresponding one of the plurality of stages,
wherein a subset of the plurality of LEDs are arranged on a first side of a circuit board and at least one LED of each color is arranged on a second side of the circuit board opposite to the first side;
a light sensor disposed on a second circuit board facing the at least one LED of each color; and
a controller configured to receive detection results from each light sensor and a control current control signal input to a linear current regulator per color based on the respective detection results.

13. The system of claim 12, further comprising a plurality of baffles installed between adjacent light sensors.

14. The system of claim 12, wherein the at least one LED of each color is from a same cluster.

15. The system of claim 12, wherein the LEDs are arranged in packages, and wherein at least one package is arranged on the second side.

\* \* \* \* \*